US010102306B2

United States Patent
Le Bras et al.

(10) Patent No.: US 10,102,306 B2
(45) Date of Patent: Oct. 16, 2018

(54) PATCHING BASE DOCUMENT OBJECT MODEL (DOM) WITH DOM-DIFFERENTIALS TO GENERATE HIGH FIDELITY REPLAY OF WEBPAGE USER INTERACTIONS

(71) Applicant: International Business Machines Corporation, Armonk, NY (US)

(72) Inventors: Yves Le Bras, Foster City, CA (US); Lalith Kumar Maddali, Fremont, CA (US); Manoj Punjabi, Dublin, CA (US); Haixiao Yu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 15/145,170

(22) Filed: May 3, 2016

(65) Prior Publication Data
US 2017/0323026 A1  Nov. 9, 2017

(51) Int. Cl.
*G06F 15/00* (2006.01)
*G06F 13/00* (2006.01)
*G06F 17/30* (2006.01)
*G06F 17/22* (2006.01)

(52) U.S. Cl.
CPC .... *G06F 17/30905* (2013.01); *G06F 17/2247* (2013.01); *G06F 17/30368* (2013.01)

(58) Field of Classification Search
CPC ............................ G06F 3/048; G06Q 10/0633
USPC ................................ 715/704, 221, 234, 761
See application file for complete search history.

(56) References Cited

U.S. PATENT DOCUMENTS

| 8,407,321 B2 | 3/2013 | Mickens et al. |
| 8,533,532 B2 | 9/2013 | Wenig et al. |
| 8,768,928 B2 | 7/2014 | Ayoub et al. |
| 8,868,533 B2 | 10/2014 | Powell et al. |
| 2010/0095208 A1* | 4/2010 | White ............... G06F 17/30905 715/704 |
| 2010/0211865 A1 | 8/2010 | Fanning et al. |
| 2011/0246879 A1* | 10/2011 | White ................. G06F 17/3089 715/704 |
| 2011/0258538 A1 | 10/2011 | Liu et al. |
| 2012/0117455 A1* | 5/2012 | Fogel ................. G06Q 10/0633 715/221 |
| 2013/0091417 A1* | 4/2013 | Cordasco .......... G06F 17/30902 715/234 |

(Continued)

OTHER PUBLICATIONS

Andrica et al., "WaRR: A Tool for High-Fidelity Web Application Record and Replay," 2011 IEEE/IFIP 41st International Conference on Dependable Systems & Networks (DSN), Jun. 2011, pp. 403-410.

(Continued)

*Primary Examiner* — Kevin Nguyen
(74) *Attorney, Agent, or Firm* — Yee & Associates, P.C.; Nicholas D. Bowman (57) ABSTRACT

Generating replay of a webpage is provided. In response to determining that a document object model (DOM) replay of the webpage is a differential DOM replay, a base DOM of the webpage, base DOM differentials of the webpage, and user interactions with the webpage are retrieved. The base DOM of the webpage is patched with the base DOM differentials of the webpage to generate a patched DOM corresponding to the webpage. The user interactions with the webpage are overlaid on the patched DOM to generate the replay of the webpage.

20 Claims, 5 Drawing Sheets

(56) References Cited

U.S. PATENT DOCUMENTS

| | | | |
|---|---|---|---|
| 2013/0132833 A1* | 5/2013 | White | G06F 3/048 |
| | | | 715/704 |
| 2014/0137052 A1 | 5/2014 | Hernandez et al. | |
| 2015/0120823 A1 | 4/2015 | D'Aurelio et al. | |
| 2015/0149916 A1 | 5/2015 | Mendez et al. | |
| 2015/0189014 A1 | 7/2015 | Grunenberger | |
| 2015/0193399 A1 | 7/2015 | Woker et al. | |
| 2015/0248486 A1 | 9/2015 | Barak et al. | |

OTHER PUBLICATIONS

Burg et al., "Explaining Visual Changes in Web Interfaces," Proceedings of the 28th Annual ACM Symposium on User Interface Software & Technology (UIST '15), Nov. 2015, pp. 259-269.

"System and Method to Record Document Object Model (DOM) Changes in Web Browsers," IP.com Prior Art Database Technical Disclosure No. IPCOM00145213D, Jan. 10, 2007, 3 pages.

Grace Period Disclosure: Yves Le Bras, Lalith K. Maddali, Manoj Punjabi, and Haixiao Yu, "DOM Capture and Replay," IBM Corporation, Tealeaf Customer Experience 9.0.2, Sep. 18, 2015, 3 pages. http://www.ibm.com/support/knowledgecenter/SS2MBL_9.0.2/cxImpactUser/UIC/UICj2CfgWiz/DOMCaptureAndReplay.dita?lang=en.

\* cited by examiner

PATCHING BASE DOCUMENT OBJECT MODEL (DOM) WITH DOM-DIFFERENTIALS TO GENERATE HIGH FIDELITY REPLAY OF WEBPAGE USER INTERACTIONS

STATEMENT REGARDING PRIOR DISCLOSURES BY THE INVENTOR OR A JOINT INVENTOR

The following disclosure is submitted under 35 U.S.C. § 102(b)(1)(A):

Yves Le Bras, Lalith K. Maddali, Manoj Punjabi, and Haixiao Yu, "DOM Capture and Replay," IBM Corporation, Tealeaf Customer Experience 9.0.2, Sep. 18, 2015 made publicly available, 3 pages.

BACKGROUND

1. Field

The disclosure relates generally to replaying a webpage and more specifically to patching a base document object model (DOM) corresponding to the webpage with a set of base DOM differentials to generate a patched DOM and overlaying captured user interactions with the webpage on the patched DOM to generate a high fidelity replay of the user interactions with the webpage.

2. Description of the Related Art

Replay of World Wide Web 2.0—based websites is one of the hottest technologies in web analytics and customer experience management. Web 2.0 describes websites that emphasize client-generated content via a web browser, usability, and interoperability. Examples of Web 2.0 may include social network websites, blogs, wikis, folksonomies, video sharing websites, hosted services, web applications, and mashups.

Web session replay is the ability to replay a visitor's session on a webpage or website or in a web application. Web session replay may be used for improving website conversion, website usability, and customer behavior analysis as the visitor's session with all interactions can be replayed. Some web session replay solutions may augment the session replay with advanced analytics to identify segments of visitors that are struggling to use a particular website. Further, some web session replay solutions may use advanced analytics to identify fraudulent behavior on websites.

SUMMARY

According to one illustrative embodiment, a computer-implemented method for generating replay of a webpage is provided. In response to a computer determining that a document object model (DOM) replay of the webpage is a differential DOM replay, the computer retrieves a base DOM of the webpage, base DOM differentials of the webpage, and user interactions with the webpage. The computer patches the base DOM of the webpage with the base DOM differentials of the webpage to generate a patched DOM corresponding to the webpage. The computer overlays the user interactions with the webpage on the patched DOM to generate the replay of the webpage. According to other illustrative embodiments, a computer system and computer program product for generating replay of a webpage are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
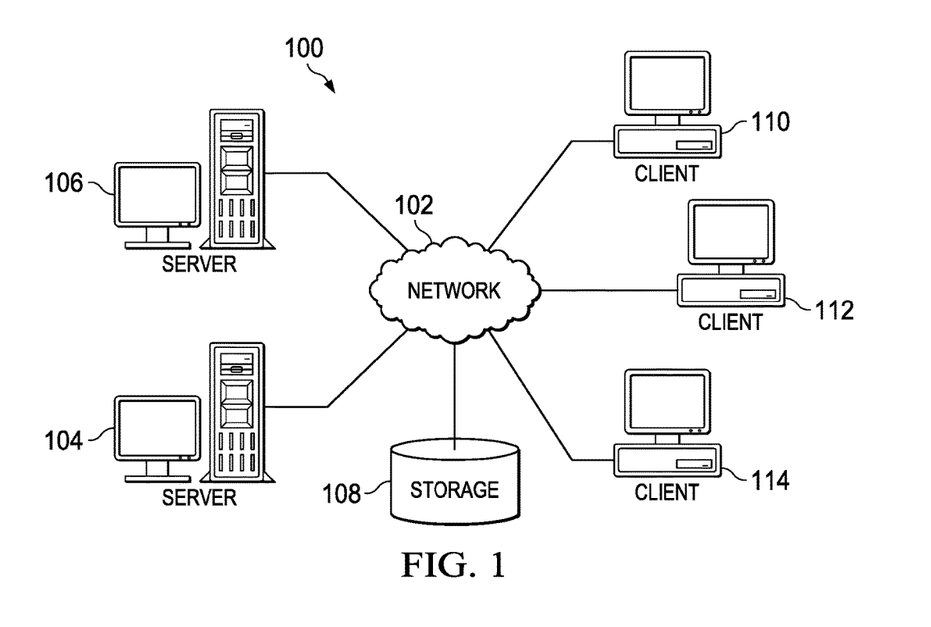
FIG. 1 is a pictorial representation of a network of data processing systems in which illustrative embodiments may be implemented.
Figure 2:
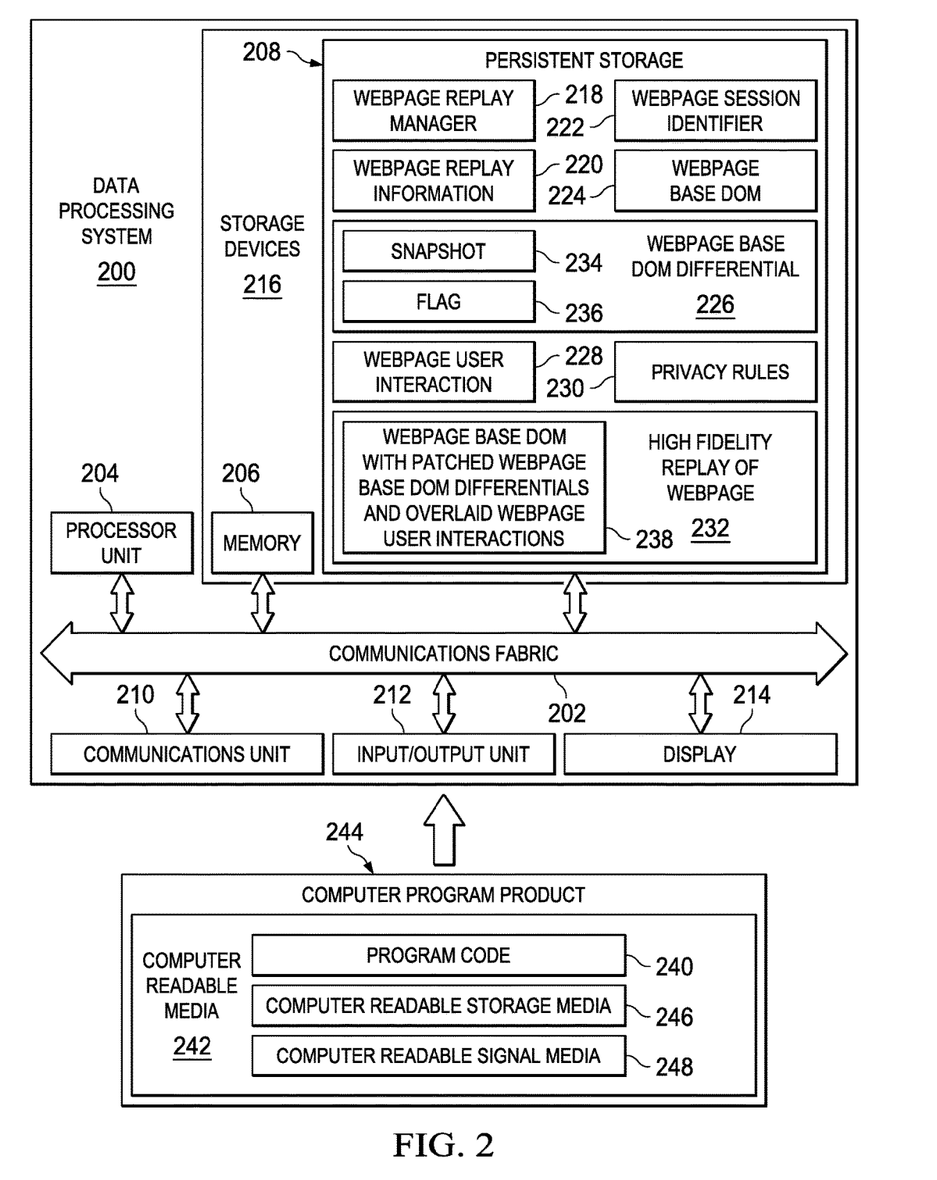
FIG. 2 is a diagram of a data processing system in which illustrative embodiments may be implemented.
Figure 3:
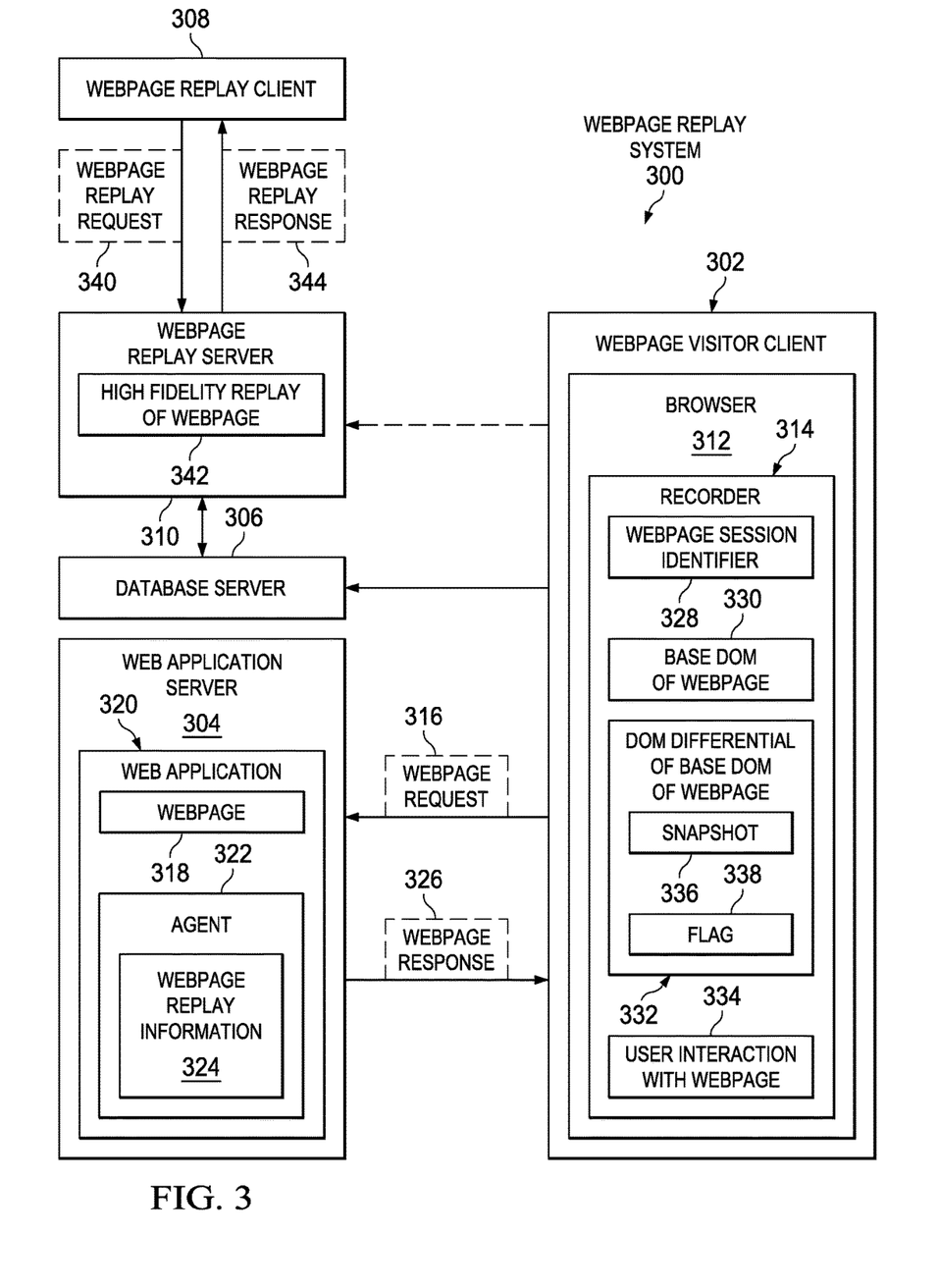
FIG. 3 is a diagram illustrating an example of a webpage replay system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services to users of client devices. For example, server 104 may host one or more web applications that provide webpages to requesting clients. In addition, server 106 may provide high fidelity replay of user interactions with the webpages to registered replay clients.

Client 110, client 112, and client 114 also connect to network 102. Clients 110, 112, and 114 are clients of server 104 or server 106. For example, client 110 and client 112 may be clients of server 104 to request and view a set of webpages hosted by server 104. Client 114 may be a client of server 106. Client 114 may represent an owner of the set of webpages hosted by server 104. A user of client 114 may request from server 106 a high fidelity replay of user interactions with the set of webpages by users of clients 110 and 112. Further, server 104 and server 106 may provide information, such as boot files, operating system images, and software applications to clients 110, 112, and 114.

In this example, clients 110, 112, and 114 are illustrated as desktop computers, which may have wire or wireless communication links to network 102. However, it should be noted that clients 110, 112, and 114 are intended as examples only. In other words, clients 110, 112, and 114 also may include other devices, such as, for example, laptop computers, handheld computers, smart phones, smart watches, personal digital assistants, gaming devices, set-top boxes, kiosks, or any combination thereof.

Storage 108 is a network storage device capable of storing any type of data in a structured format or an unstructured format. In addition, storage 108 may represent a set of one or more network storage devices. Storage 108 may store, for example, names and identification numbers for a plurality of different users of the webpage replay service, identification numbers for a plurality of different client devices equipped with browsers having a capability to capture base DOM-differentials and user interactions with webpages, captured base DOMs corresponding to the webpages, captured base DOM differentials corresponding to the webpages, captured user interactions with the webpages, session identifiers corresponding to the webpages, privacy rules, and the like. Further, storage 108 may store other data, such as authentication or credential data that may include user names, passwords, and biometric data associated with the plurality of different users and system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 106 and downloaded to client 114 over network 102 for use on client 114.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 106 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device.

Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores webpage replay manager 218. Webpage replay manager 218 generates a high fidelity replay of user interactions with a webpage by patching a base DOM of the webpage with a set of base DOM differentials and overlaying captured user interactions with the webpage on the patched base DOM. A DOM is a cross-platform and language-independent convention for representing and interacting with objects in hypertext markup language (HTML), extensible hypertext markup language (XHTML), and extensible markup language (XML) documents corresponding to webpages. Nodes of a markup language document are organized in a tree structure known as a DOM tree. Objects in the DOM tree may be addressed and manipulated by using methods on the objects.

It should be noted that even though webpage manager 218 is illustrated as residing in persistent storage 208, in an alternative illustrative embodiment webpage replay manager 218 may be a separate component of data processing system 200. For example, webpage replay manager 218 may be a hardware component coupled to communication fabric 202 or a combination of hardware and software components.

Also in this example, persistent storage 208 stores webpage replay information 220, webpage session identifier 222, webpage base DOM 224, webpage base DOM differential 226, webpage user interaction 228, privacy rules 230, and high fidelity replay of webpage 232. Webpage replay information 220 provides information regarding a type of webpage replay that webpage replay manager 218 is to perform for a webpage replay client. The types of webpage replay may include, for example, a classical replay, a full DOM replay, and a differential DOM replay. A classical replay is replaying user interactions on a particular webpage using captured network traffic between a web application server hosting the webpage and clients visiting the webpage. A full DOM replay is replaying user interactions on a particular webpage using a plurality of captured entire DOMs (i.e., capturing the entire DOM at each defined event) corresponding to the webpage. A differential DOM replay is replaying user interactions on a particular webpage using captured base DOM differentials (i.e., capturing only differences or changes to a base DOM at defined events and applying the differences to the base DOM) corresponding to the webpage. Webpage replay manager 218 may obtain webpage replay information 220 from, for example, an agent embedded in a web application corresponding to the webpage. Alternatively, the agent may be embedded in a webpage or in a web browser plug-in. Webpage replay manager 218 may implement and deploy the agent in any form.

Webpage replay manager 218 may utilize webpage session identifier 222 to identify a particular user session corresponding to a particular webpage. Webpage session identifier 222 may represent a plurality of different webpage session identifiers corresponding to a plurality of different webpage sessions. Webpage base DOM 224 represents a base DOM corresponding to a particular webpage. A base DOM is an initial snapshot of the DOM corresponding to the particular webpage after the webpage is fully loaded on a client device by a browser. Webpage base DOM 224 may represent a plurality of different webpage base DOMs corresponding to a plurality of different webpages.

Webpage base DOM differential 226 only represents a change or delta to webpage base DOM 224 and not the entire base DOM. Webpage base DOM differential 226 may represent a plurality of different changes to a particular webpage during a particular session. Webpage replay manager 218 utilizes webpage base DOM differential 226 to patch webpage base DOM 224 with the change to webpage base DOM 224. Webpage base DOM differential 226 may be captured in snapshot 234. In addition, webpage base DOM differential 226 may include flag 236. Flag 236 indicates that webpage base DOM differential 226 represents a change to the base DOM and not the entire base DOM.

Webpage user interaction 228 represents an activity or event performed by a user on the webpage corresponding to webpage base DOM 224. A user interaction with the webpage may be, for example, scrolling of the webpage using a mouse wheel or slider bar, activation of a link embedded in the webpage using a mouse click, entering textual data in a field of the webpage using a keypad or keyboard, dragging and dropping an item on the webpage using touch screen inputs, and the like. It should be noted that webpage user interaction 228 may represent a plurality of different user activities or actions performed by the user on the webpage during a session. Webpage replay manager 218 may overlay webpage user interaction 228 on the patched base DOM, which includes the differentials corresponding to changes in the base DOM.

Privacy rules 230 define how sensitive or personal information, such as, for example, username, password, biometric data, social security number, birth date, bank account data, health care data, and the like, corresponding to the user, which may be captured during a webpage session, may be handled. For example, webpage replay manager 218 may utilize privacy rules 230 to determine that all or a portion of the user's personal information is to be deleted from a replay of a webpage.

Webpage replay manager 218 transmits high fidelity replay of webpage 232 to a registered webpage replay client, such as client 114 in FIG. 1, upon request. High fidelity replay of webpage 232 captures all user interactions within the webpage from a perspective of the user when interacting with the webpage. In other words, high fidelity replay of webpage 232 exactly matches the webpage, dynamic content webpage changes, and user interactions on a per user basis. High fidelity replay of webpage 232 may represent replay of all of a webpage session of a user or a portion of the session. The portion of the session may be a user-defined portion of the session. For example, the replay user may define the portion in terms of an interval of time, such as one or more specified days or during specified hours of a day, or may define the portion in terms of a specified set of HTML input elements within the webpage, which a viewing user of the webpage may interact with. High fidelity replay of webpage 232 also may represent replay of a plurality of different user sessions or portions thereof. High fidelity replay of webpage 232 includes webpage base DOM with patched webpage base DOM differentials and overlaid webpage user interactions 238 to create a realistic simulation of all user interactions with the webpage.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that current DOM capture-based solutions capture the whole DOM of a webpage on a client browser and then send the whole DOM to a server. The server uses the whole DOM to replay the webpage. However, this is a lot of data to transfer over a network. Some current solutions try to reduce the amount of data to be sent to the server by only capturing DOM mutations. However, these solutions do not capture HTML input element changes.

Illustrative embodiments define how to apply DOM-based differential patches on an original base DOM and to properly apply user interaction data so that illustrative embodiments correctly display a webpage replay true to the original webpage. In other words, illustrative embodiments provide a process for generating high fidelity webpage replay. In addition, illustrative embodiments reduce the amount of data transferred over a network from a client browser to a replay server, which reduces network traffic and server processing payload.

Illustrative embodiments may utilize, for example, differential, match, and patch libraries for plain text. Differential, match, and patch libraries offer algorithms to perform the operations required for synchronizing plain text. For example, the differential portion compares two blocks of plain text and returns a list of differences or changes. For a given search string, the matching portion finds the given search string's best fuzzy match in a block of plain text (i.e., weighted for both accuracy and location). The patching portion applies a list of patches onto the plain text (i.e., using best-effort to apply a patch even when the underlying text doesn't match exactly).

Further, illustrative embodiments may add more context information to the DOM differentials so that illustrative embodiments may apply privacy rules using just the DOM differentials without having to reconstruct the full DOM. For example, illustrative embodiments may add up to 256 characters before and after a differential to give more context to a change. For example, illustrative embodiments may only get a number change in response to the total amount of changes corresponding to an onClick event on the webpage. If illustrative embodiments add more text information around the onClick event, then illustrative embodiments will be able to detect that this was the total amount of the changes and not a quantity or some other value on the webpage.

Differential, match, and patch libraries are available in several programming languages, such as, for example, Java, JavaScript, Dart, C++, C#, Objective C, Lua, and Python. Regardless of language, each library may feature the same application programming interface (API) and the same functionality. The libraries may implement, for example, a Myer's diff algorithm. Also, a layer of pre-diff speedups and post-diff cleanups may surround the diff algorithm, improving both performance and output quality. These libraries also may implement a bitmap matching algorithm to provide a flexible matching and patching strategy.

Illustrative embodiments may modify a client browser to include a recorder to do the following: 1) save a full base DOM corresponding to a webpage when a base DOM of the webpage has not been saved before or when a session identifier corresponding to the webpage has changed; 2) if a base DOM of the webpage has been saved, then calculate base DOM differentials using the algorithms in the differential, match, and patch libraries; and 3) send those base DOM differentials to at least one of a database server and a webpage replay server for analysis and processing. Alternatively, the client browser may instead send a full DOM of the webpage for each differential or change to the DOM. In addition, the client browser recorder may add a flag or bit to the data packets to indicate whether the information being sent to the server is base DOM differentials or full DOMs.

Illustrative embodiments may invoke a callback function to a DOM differential observer whenever any relevant changes happen to target HTML input element(s), but not until all script within the current scope has run. It is possible that more than one DOM differential (each represented by a single differential record) might have occurred since the last time the callback function was invoked. Illustrative embodiments may fire the DOM differential observers asynchronously but "soon," which means that the DOM differential observers may fire before other things in the queue, such as, for example, layout, paint, or triggered events. This ameliorates the loss of synchrony because illustrative embodiments do not have to worry about screen flashing or other bad things happening before the DOM differential observers get a chance to react.

Alternatively, illustrative embodiments may utilize DOM change listeners in the client browser to detect and retrieve changes to the base DOM instead of doing text differentials.

By utilizing DOM change listeners, illustrative embodiments may decrease processing time to process the DOM differentials and also may allow illustrative embodiments to obtain more context information for applying the privacy rules by traversing the DOM tree. Illustrative embodiments may call the DOM change listeners as the changes occur.

On the server side, illustrative embodiments may utilize one of two options. In the first option, the webpage replay server stores the base DOM differentials in a database server. Every time webpage session data is needed, illustrative embodiments retrieve the base DOM differentials from the database and patch the base DOM with the differentials. Illustrative embodiments reconstruct webpages when replaying webpages, indexing webpage sessions, applying privacy rules, and processing events. This option decreases the amount of space needed on the server's disk to store the session data. However, this option may slow down processing of the session data and also may slow down replay due to the time needed to reconstruct the webpages from the differentials.

In the second option, the webpage replay server reconstructs the full DOM of the webpage on the server in response to receiving the DOM differentials from the client browser recorder and stores the full DOM on the database server. This option may yield faster response time during replay, indexing, and event processing. However, this option may require a bigger footprint on the server (i.e., increased storage space requirement on the server's disk).

Alternative illustrative embodiments may employ a third option. The third option may utilize a webpage visitor client-side reconstruction of the DOM of the webpage and a webpage replay server reconstruction of the DOM. By combination the client-side and server-side reconstructions of the DOM of the webpage, the alternative illustrative embodiments may generate an enhanced high fidelity replay of the webpage.

When reconstructing the full DOM of the webpage, illustrative embodiments may apply privacy rules. However, when applying privacy rules, illustrative embodiments need context information and the DOM differentials may not provide that information. Illustrative embodiments may not be able to reconstruct the full DOM when applying the privacy rules since illustrative embodiments do not have access to the session data at that time and will not be able to know the last DOM for that particular session to apply the DOM differentials to it.

To address this issue, illustrative embodiments may utilize a process that will run before applying the privacy rules. The process will: 1) keep a running cache of the last full DOM for all active sessions; 2) for every hit having DOM differentials, search for its corresponding session in the cache and use the last DOM in the cache to reconstruct the hit's full DOM; 3) pass the new hit with the full DOM downstream; and 4) once a session is complete, remove the session from the cache.

In addition, illustrative embodiments may apply replay rules designed to enhance the webpage replay experience. Replay rules enable the highest high fidelity replay possible without impacting the server or servers hosting the web application. A replay rule modifies the session data during webpage replay so that the replay looks as close as possible to the original experience of a visitor to the webpage. As an example, captured webpage session data may contain references to a server that is not available from where a webpage replay client is replaying the webpage session. As a result, illustrative embodiments may configure a replay rule to modify uniform resource locators pointing to the origin server to point to a different server. As another example, if a webpage session is provided by a web application that requires authentication, then an unauthenticated replay client may generate a number of access denied errors during webpage replay. Consequently, illustrative embodiments may configure a replay rule to instruct the web browser recorder to ignore or remove these pages during webpage replay. As a further example, a webpage session may reference an external cascading style sheet file for formatting content of the webpage, which illustrative embodiments may or may not want to reference during webpage replay. Thus, illustrative embodiments may configure a replay rule to suppress the external file or to modify the external file so that it works effectively during session replay.

Illustrative embodiments may utilize a DOM differential observer application programming interface (API) to determine changes to the full DOM tree. For example, the DOM differential observer API may determine node additions, node deletions, and attribute modifications to the DOM tree. "Attributes" are base DOM attribute modifications. When an attribute is changed on an element, the differential type will be "attribute." The name of the attribute may be "differential attribute name" and value of the new attribute may be found on a "differential target attribute" corresponding to the differential attribute name. "Character data" is textual content of a node when it is changed. "Differential old value" is the old text value of the node. "Differential target node value" will have the new text value of the node.

With reference now to FIG. 3, a diagram illustrating an example of a webpage replay system is depicted in accordance with an illustrative embodiment. Webpage replay system 300 may be implemented in a network of data processing systems, such as, for example, network data processing system 100 in FIG. 1. Webpage replay system 300 generates high fidelity replay of user interactions with webpages by patching base DOMs corresponding to the webpages with base DOM differentials and overlaying captured user interactions with the webpages on the patched base DOMs.

In this example, webpage replay system 300 includes webpage visitor client 302, web application server 304, database server 306, webpage replay client 308, and webpage replay server 310. However, it should be noted that webpage replay system 300 is only meant as an example and not as a limitation on illustrative embodiments. In other words, webpage replay system 300 may include any number of clients and servers.

Webpage visitor client 302 may be, for example, client 110 in FIG. 1. A user of webpage visitor client 302 uses webpage visitor client 302 to retrieve and view one or more webpages provided by web application server 304. Webpage visitor client 302 includes browser 312. Browser 312 renders an HTML document corresponding to a webpage, downloads the HTML document into local memory, and parses the HTML document to display on a screen of webpage visitor client 302. When the webpage is loaded, browser 312 generates a base DOM of the webpage.

Browser 312 includes recorder 314. Recorder 314 saves the base DOM of the webpage, records base DOM differentials, and sends the base DOM differentials to database server 306 and/or webpage replay server 310.

Webpage visitor client 302 sends webpage request 316 to web application server 304 for webpage 318 corresponding to web application 320. Web application server 304 may be, for example, server 104 in FIG. 1. Web application 320 includes agent 322. Agent 322 includes webpage replay information 324, which indicates the type of webpage replay desired by webpage replay client 308. Webpage replay information 324 may be, for example, webpage replay information 220 in FIG. 2. Webpage replay client 308 may be the owner of web application 320 and webpage 318. Webpage replay client 308 may be, for example, client 114 in FIG. 1.

Web application server 304 sends webpage response 326, which includes webpage 318 and webpage replay information 324, to webpage visitor client 302. Browser 312 generates webpage session identifier 328 and base DOM of webpage 330 for webpage 318. Webpage session identifier 328 and base DOM of webpage 330 may be, for example, webpage session identifier 222 and webpage base DOM 224 in FIG. 2. Recorder 314 records base DOM of webpage 330 and captures DOM differential of base DOM of webpage 332 and user interaction with webpage 334. DOM differential of base DOM of webpage 332 and user interaction with webpage 334 may be, for example, webpage base DOM differential 226 and webpage user interaction 228 in FIG. 2. It should be noted that DOM differential of base DOM of webpage 332 and user interaction with webpage 334 may represent a plurality of different DOM differentials and user interactions. Also, it should be noted that high fidelity recording requires that recorder 314 capture all user interactions with webpage 318.

Recorder 314 may capture base DOM of webpage 330, DOM differential of base DOM of webpage 332, and user interaction with webpage 334 using snapshot 336. Snapshot 336 may be, for example, snapshot 234 in FIG. 2 and represent a plurality of different snapshots. In addition, recorder 314 may add flag 338 to DOM differential of base DOM of webpage 332 to indicate that DOM differential of base DOM of webpage 332 is a DOM differential only and not a full DOM of webpage 318.

Browser 312 sends webpage session identifier 328, base DOM of webpage 330, DOM differential of base DOM of webpage 332, and user interaction with webpage 334 to database server 306 for storage and later processing by webpage replay server 310. Database server 306 may be, for example, storage 108 in FIG. 1. Alternatively, browser 312 may send webpage session identifier 328, base DOM of webpage 330, DOM differential of base DOM of webpage 332, and user interaction with webpage 334 directly to webpage replay server 310 for real-time or near real-time processing and replay. Webpage replay server 310 may be, for example, server 106 in FIG. 1.

Webpage replay client 308 sends webpage replay request 340 to webpage replay server 310. In response, webpage replay server 310 generates high fidelity replay of webpage 342 based on base DOM of webpage 330, DOM differential of base DOM of webpage 332, and user interaction with webpage 334 retrieved from database server 306 and/or received directly from browser 312. High fidelity replay of webpage 342 may be, for example, high fidelity replay of webpage 232, which includes webpage base DOM with patched webpage base DOM differentials and overlaid webpage user interactions 238 in FIG. 2. Webpage replay server 310 sends webpage replay response 344, which includes high fidelity replay of webpage 342, to webpage replay client 308 for review and analysis by replay users.

Figure 4:
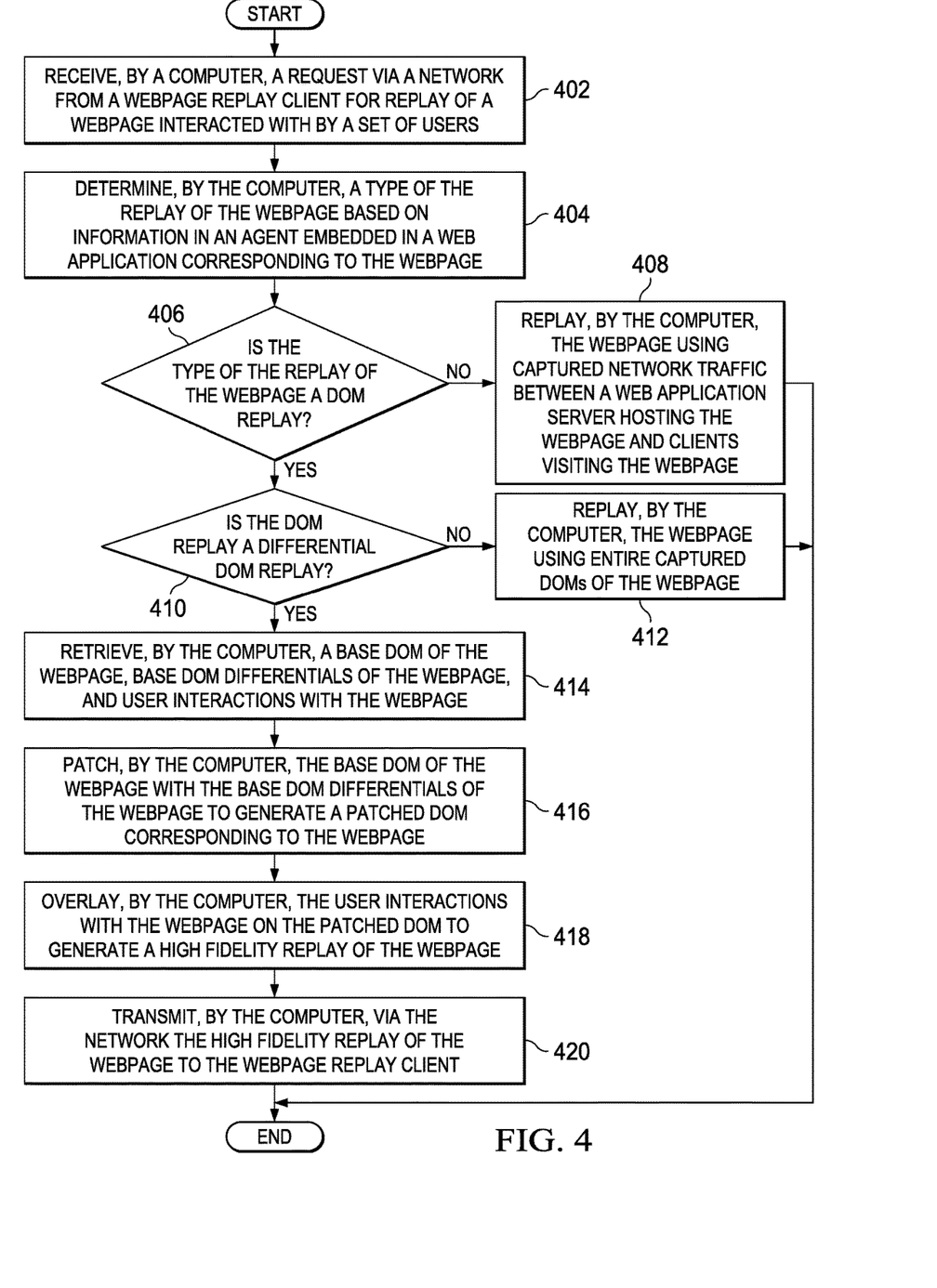
FIG. 4 is a flowchart illustrating a process for replaying a webpage by a webpage replay server device in accordance with an illustrative embodiment.

With reference now to FIG. 4, a flowchart illustrating a process for replaying a webpage by a webpage replay server device is shown in accordance with an illustrative embodiment. The process shown in FIG. 4 may be implemented in a computer, such as, for example, server 106 in FIG. 1 and data processing system 200 in FIG. 2.

The process begins when the computer receives a request via a network from a webpage replay client for replay of a webpage interacted with by a set of one or more users (step 402). The request may be, for example, webpage replay request 340 from webpage replay client 308 in FIG. 3. The network may be, for example, network 102 in FIG. 1. The set of users may be, for example, webpage replay users of client 114 in FIG. 1.

After receiving the request in step 402, the computer determines a type of the replay of the webpage based on information in an agent embedded in a web application corresponding to the webpage (step 404). The information may be, for example, webpage replay information 324 in agent 322 in web application 320 corresponding to webpage 318 in FIG. 3. Afterward, the computer makes a determination as to whether the type of the replay of the webpage is a DOM replay (step 406). If the computer determines that the type of the replay of the webpage is not a DOM replay, no output of step 406, then the computer replays the webpage using captured network traffic between a web application server hosting the webpage and clients visiting the webpage (step 408). Thereafter, the process terminates.

If the computer determines that the type of the replay of the webpage is a DOM replay, yes output of step 406, then the computer makes a determination as to whether the DOM replay is a differential DOM replay (step 410). If the computer determines that the DOM replay is not a differential DOM replay, no output of step 410, then the computer replays the webpage using entire captured DOMs of the webpage (step 412). Thereafter, the process terminates.

If the computer determines that the DOM replay is a differential DOM replay, yes output of step 410, then the computer retrieves a base DOM of the webpage, base DOM differentials of the webpage, and user interactions with the webpage (step 414). The base DOM of the webpage, base DOM differentials of the webpage, and user interactions with the webpage may be, for example, base DOM of webpage 339, DOM differential of base DOM of webpage 332, and user interactions with webpage 334 in FIG. 3. The computer patches the base DOM of the webpage with the base DOM differentials of the webpage to generate a patched DOM corresponding to the webpage (step 416). In addition, the computer overlays the user interactions with the webpage on the patched DOM to generate a high fidelity replay of the webpage (step 418). The high fidelity replay of the webpage may be, for example, high fidelity replay of webpage 342 in FIG. 3. The computer transmits via the network the high fidelity replay of the webpage to the webpage replay client (step 420). Thereafter, the process terminates.

Figure 5:
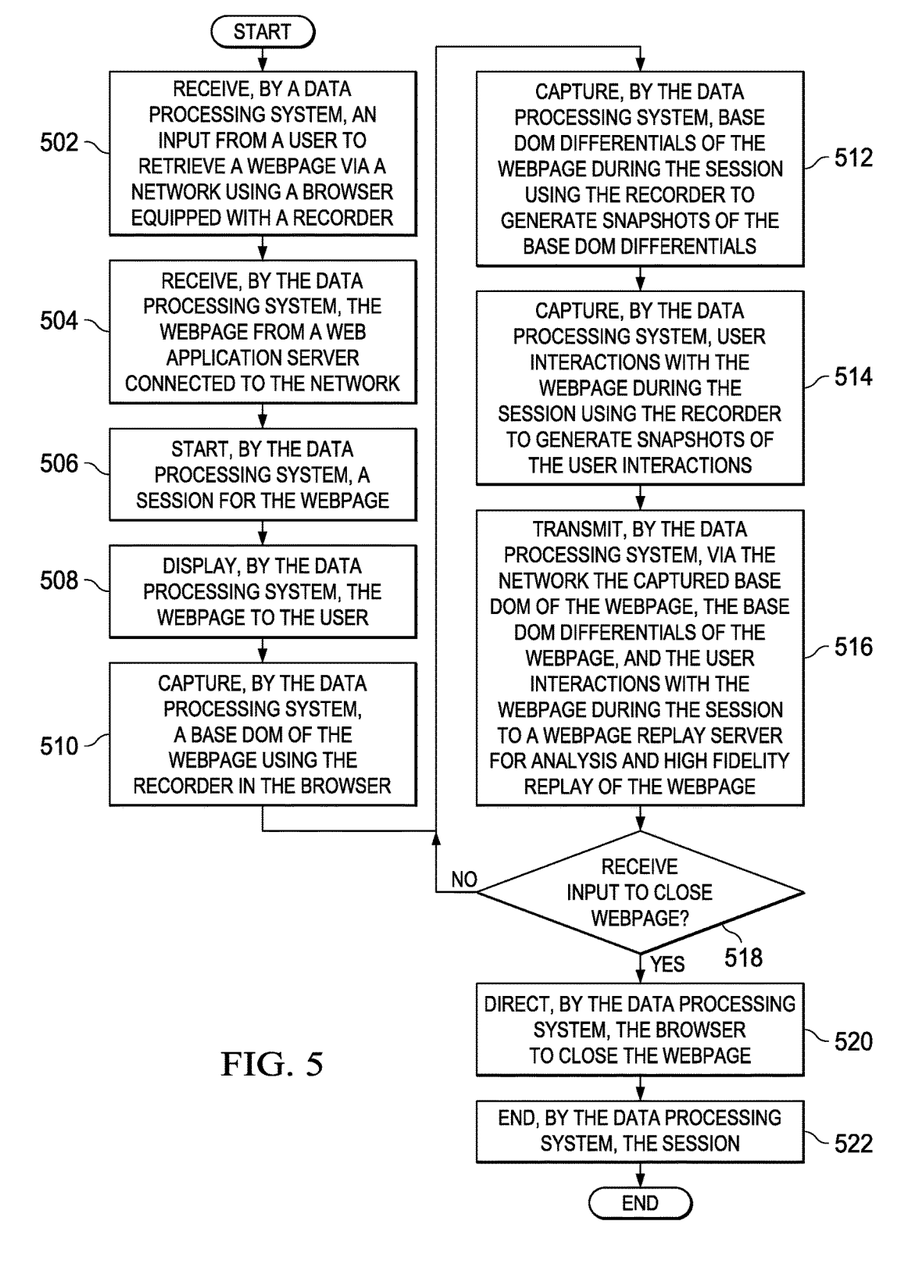
FIG. 5 is a flowchart illustrating a process for capturing webpage DOM differentials and user interactions by a webpage visiting client device in accordance with an illustrative embodiment.

With reference now to FIG. 5, a flowchart illustrating a process for capturing webpage DOM differentials and user interactions by a webpage visiting client device is shown in accordance with an illustrative embodiment. The process shown in FIG. 5 may be implemented in a data processing system, such as, for example, client 110 or client 112 in FIG. 1 and webpage visitor client 302 in FIG. 3.

The process begins when the data processing system receives an input from a user to retrieve a webpage via a network using a browser equipped with a recorder (step 502). The webpage may be, for example, webpage 318 in FIG. 3. The network may be, for example, network 102 in FIG. 1. The browser equipped with the recorder may be, for example, browser 312 equipped with recorder 314 in FIG. 3.

Afterward, the data processing system receives the webpage from a web application server connected to the network (step 504). The web application server may be, for example, web application server 304 in FIG. 3. In addition, the data processing system starts a session for the webpage (step 506) and displays the webpage to the user (step 508).

Further, the data processing system captures a base DOM of the webpage using the recorder in the browser (step 510). The base DOM of the webpage may be, for example, base DOM of webpage 330 in FIG. 3. Furthermore, the data processing system captures base DOM differentials of the webpage during the session using the recorder to generate snapshots of the base DOM differentials (step 512). The base DOM differentials of the webpage may be, for example, DOM differential of base DOM of webpage 332 in FIG. 3. The snapshots may be, for example, snapshot 336 in FIG. 3.

Moreover, the data processing system captures user interactions with the webpage during the session using the recorder to generate snapshots of the user interactions (step 514). The user interactions with the webpage may be, for example, user interactions with webpage 334 in FIG. 3. The data processing system transmits via the network the captured base DOM of the webpage, the base DOM differentials of the webpage, and the user interactions with the webpage during the session to a webpage replay server for analysis and high fidelity replay of the webpage (step 516). The webpage replay server may be, for example, webpage replay server 310 in FIG. 3.

Subsequently, the data processing system makes a determination as to whether the data processing system received an input to close the webpage (step 518). If the data processing system determines that an input to close the webpage was not received, no output of step 518, then the process returns to step 512 where the data processing system continues to capture base DOM differentials and user interactions. If the data processing system determines that an input to close the webpage was received, yes output of step 518, then the data processing system directs the browser to close the webpage (step 520). Afterward, the data processing system ends the session (step 522). Thereafter, the process terminates.

Thus, illustrative embodiments of the present invention provide a computer-implemented method, computer system, and computer program product for patching a base DOM corresponding to a webpage with a set of base DOM differentials to generate a patched DOM and overlaying captured user interactions with the webpage on the patched DOM to generate a high fidelity replay of the user interactions with the webpage. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating replay of a webpage, the computer-implemented method comprising:
responsive to a computer determining that a document object model (DOM) replay of the webpage is a differential DOM replay, retrieving, by the computer, a base DOM of the webpage, base DOM differentials of the webpage, and user interactions with the webpage;
patching, by the computer, the base DOM of the webpage with the base DOM differentials of the webpage to generate a patched DOM corresponding to the webpage; and
overlaying, by the computer, the user interactions with the webpage on the patched DOM to generate the replay of the webpage.

2. The computer-implemented method of claim 1 further comprising:
responsive to the computer determining that the DOM replay is not the differential DOM replay based on webpage replay information maintained by the computer, replaying, by the computer, the webpage using entire captured DOMs of the webpage.

3. The computer-implemented method of claim 1, wherein the base DOM differentials of the webpage represents at least one change to the base DOM of the webpage and not the base DOM of the webpage in its entirety.

4. The computer-implemented method of claim 3 further comprising:
receiving, by the computer, a request via a network from a webpage replay client for replay of the webpage interacted with by a set of one or more users, wherein the base DOM differentials represent a plurality of different changes to the base DOM of the webpage during a particular session.

5. The computer-implemented method of claim 1 further comprising:
determining, by the computer, a type of replay of the webpage based on information in an agent embedded in a web application corresponding to the webpage.

6. The computer-implemented method of claim 1 further comprising:
receiving, by the computer, via a network a captured base DOM of the webpage, captured base DOM differentials of the webpage, and captured user interactions with the webpage during a session.

7. The computer-implemented method of claim 6, wherein the captured base DOM of the webpage, the captured base DOM differentials of the webpage, and the captured user interactions with the webpage are included in a set of snapshots.

8. The computer-implemented method of claim 1, wherein the base DOM differentials of the webpage include a flag indicating that the base DOM differentials are changes to the base DOM only and not an entire base DOM.

9. The computer-implemented method of claim 1 further comprising:
applying, by the computer, privacy rules to the replay of the webpage, wherein the privacy rules define how personal information of a user interacting with the webpage captured during a session is handled.

10. The computer-implemented method of claim 9 further comprising:
adding, by the computer, context information to the base DOM differentials of the webpage to apply the privacy rules using the base DOM differentials without having to reconstruct an entire DOM.

11. The computer-implemented method of claim 1 further comprising:
applying, by the computer, replay rules to enhance the replay of the webpage, wherein the replay rules modify session data during the replay of the webpage so that the replay looks as close as possible to an original experience of a visitor to the webpage.

12. A computer system for generating replay of a webpage, the computer system comprising:
a bus system;
a storage device connected to the bus system, wherein the storage device stores program instructions; and
a processor connected to the bus system, wherein the processor executes the program instructions to:
retrieve a base document object model (DOM) of the webpage, base DOM differentials of the webpage, and user interactions with the webpage in response to determining that a DOM replay of the webpage is a differential DOM replay;
patch the base DOM of the webpage with the base DOM differentials of the webpage to generate a patched DOM corresponding to the webpage; and
overlay the user interactions with the webpage on the patched DOM to generate the replay of the webpage.

13. The computer system of claim 12, wherein the processor further executes the program instructions to:
replay the webpage using entire captured DOMs of the webpage in response to determining that the DOM replay is not the differential DOM replay based on webpage replay information maintained by the computer system.

14. A computer program product for generating replay of a webpage, the computer program product comprising a non-transitory computer readable storage medium having program instructions embodied therewith, the program instructions executable by a computer to cause the computer to perform a method comprising:
responsive to the computer determining that a document object model (DOM) replay of the webpage is a differential DOM replay, retrieving, by the computer, a base DOM of the webpage, base DOM differentials of the webpage, and user interactions with the webpage;
patching, by the computer, the base DOM of the webpage with the base DOM differentials of the webpage to generate a patched DOM corresponding to the webpage; and
overlaying, by the computer, the user interactions with the webpage on the patched DOM to generate the replay of the webpage.

15. The computer program product of claim 14 further comprising:
responsive to the computer determining that the DOM replay is not the differential DOM replay based on webpage replay information maintained by the computer, replaying, by the computer, the webpage using entire captured DOMs of the webpage.

16. The computer program product of claim 14, wherein the base DOM differentials of the webpage represents at least one change to the base DOM of the webpage and not the base DOM of the webpage in its entirety.

17. The computer program product of claim 16 further comprising:
receiving, by the computer, a request via a network from a webpage replay client for replay of the webpage interacted with by a set of one or more users, wherein the base DOM differentials represent a plurality of different changes to the base DOM of the webpage during a particular session.

18. The computer program product of claim 14 further comprising:
determining, by the computer, a type of replay of the webpage based on information in an agent embedded in a web application corresponding to the webpage.

19. The computer program product of claim 14 further comprising:
receiving, by the computer, via a network a captured base DOM of the webpage, captured base DOM differentials of the webpage, and captured user interactions with the webpage during a session.

20. The computer program product of claim 19, wherein the captured base DOM of the webpage, the captured base DOM differentials of the webpage, and the captured user interactions with the webpage are included in a set of snapshots.

* * * * *